US006475658B1

(12) United States Patent
Pedicini et al.

(10) Patent No.: US 6,475,658 B1
(45) Date of Patent: Nov. 5, 2002

(54) AIR MANAGER SYSTEMS FOR BATTERIES UTILIZING A DIAPHRAGM OR BELLOWS

(75) Inventors: Christopher S. Pedicini, Roswell, GA (US); Dennis P. Sieminski, Atlanta, GA (US); Gary E. Gray, Marietta, GA (US); John D. Witzigreuter, Kennesaw, GA (US)

(73) Assignee: AER Energy Resources, Inc., Smyrna, GA (US)

( * ) Notice: Subject to any disclaimer, the term of this patent is extended or adjusted under 35 U.S.C. 154(b) by 0 days.

(21) Appl. No.: 09/216,026

(22) Filed: Dec. 18, 1998

(51) Int. Cl.$^7$ .............................................. H01M 12/06
(52) U.S. Cl. ........................................ 429/34; 429/27
(58) Field of Search ...................................... 429/27, 34

(56) References Cited

U.S. PATENT DOCUMENTS

| 2,639,190 A | 5/1953 | Sitzer |
| 2,938,064 A | 5/1960 | Kordesch |
| 3,160,528 A | 12/1964 | Dengler et al. |
| 3,613,732 A | 10/1971 | Wilison |
| 3,632,449 A | 1/1972 | Yardney |
| 3,871,920 A | 3/1975 | Grebier et al. |
| 3,881,959 A | 5/1975 | Tsuchida et al. |
| 3,975,210 A | 8/1976 | Warnock |
| 4,009,320 A | 2/1977 | Gerbier |
| 4,052,534 A | 10/1977 | Devitt |
| 4,063,826 A | 12/1977 | Riepe |
| 4,112,198 A | 9/1978 | Przybyla et al. |
| 4,211,830 A | 7/1980 | Chevet |
| 4,214,044 A | 7/1980 | Chevet et al. |

(List continued on next page.)

FOREIGN PATENT DOCUMENTS

| JP | Sho 50 40773 | 12/1975 |
| JP | 50 040772 B | 12/1975 |
| JP | 10-148181 | 6/1998 |
| RU | 2 106 722 C | 3/1998 |
| WO | WO 94/25991 A2 | 11/1994 |
| WO | WO 97/15090 A2 | 4/1997 |
| WO | WO 99/16145 A1 | 4/1999 |

OTHER PUBLICATIONS

"Using Shape Memory Wires—Part Two," Mondo–tronics, Inc., pp. 2–1 through 2–12. (No Date).
"Flexinol™—Actuator Wire A Solid State Actuator That Moves By Molecular Restructuring," Dynalloy, Inc. Makers of Dynamic Alloys two pages. (No Date).

Primary Examiner—John S. Maples
(74) Attorney, Agent, or Firm—Alston & Bird LLP (57) ABSTRACT

Air managers for metal-air batteries are described, utilizing a diaphragm or bellows to move air in and out of one or more air openings or to move air from an inlet to an outlet. The diaphragm or bellows may be reciprocated by a linear actuator, such as an electromagnetic oscillator, or a shape memory alloy wire. Micromachines such as microrelays may be used as actuators. The battery may include one or more air passageways preferably including an isolating passageway such as a thin elongate tube shaped to impede air flow to the air electrode when the air moving device is not operative, even while the tube remains unsealed. The result is an improved air moving device for metal-air cells that occupies a minimal amount of the volume available for battery chemistry, is usable with advanced systems for isolating the air electrodes when power is not being drawn from the metal air cell, and is capable of developing high pressure for high velocity air movement at a relatively low rate of power consumption. Prismatic and cylindrical batteries incorporating the invention are described.

21 Claims, 5 Drawing Sheets

U.S. PATENT DOCUMENTS

| | | | |
|---|---|---|---|
| 4,262,062 A | 4/1981 | Zatsky | |
| 4,269,906 A | 5/1981 | Schmechtig | |
| 4,303,743 A | 12/1981 | Reau | |
| 4,400,447 A | 8/1983 | Gerenser et al. | |
| 4,405,387 A | 9/1983 | Albrecht et al. | |
| 4,450,211 A | 5/1984 | Vignaud | |
| 4,521,497 A | 6/1985 | Tamminen | |
| 4,626,482 A | 12/1986 | Hamlen et al. | |
| 4,640,874 A | 2/1987 | Kelm | |
| 4,648,807 A | 3/1987 | Tippetts et al. | |
| 4,822,698 A | 4/1989 | Jackovitz et al. | |
| 4,855,195 A | 8/1989 | Georgopoulous et al. | |
| 4,894,295 A | 1/1990 | Cheiky | |
| 4,913,983 A | 4/1990 | Cheiky | |
| 4,938,742 A | 7/1990 | Smits | |
| 4,943,750 A | 7/1990 | Howe | |
| 5,011,380 A | 4/1991 | Kovacs | |
| 5,066,204 A | 11/1991 | Point et al. | |
| 5,085,562 A | 2/1992 | van Lintel | |
| 5,183,222 A | 2/1993 | Ramsey, Jr. | |
| 5,211,371 A | 5/1993 | Coffee | |
| 5,258,239 A | 11/1993 | Kobayashi | |
| 5,304,431 A | 4/1994 | Schumm, Jr. | |
| 5,325,880 A | 7/1994 | Johnson et al. | |
| 5,328,778 A | 7/1994 | Woodruff et al. | |
| 5,354,625 A | 10/1994 | Bentz et al. | |
| 5,356,729 A | 10/1994 | Pedicini | |
| 5,387,477 A | 2/1995 | Cheiky | |
| 5,398,011 A | 3/1995 | Kimura et al. | |
| 5,411,644 A | 5/1995 | Neukermans | |
| 5,417,235 A | 5/1995 | Wise et al. | |
| 5,449,569 A | 9/1995 | Schumm, Jr. | |
| 5,466,932 A | 11/1995 | Young et al. | |
| 5,486,429 A | 1/1996 | Thibault | |
| 5,522,712 A | 6/1996 | Winn | |
| 5,529,465 A | 6/1996 | Zengerle et al. | |
| 5,554,452 A | 9/1996 | Delmolino et al. | |
| 5,560,999 A | 10/1996 | Pedicini et al. | |
| 5,599,174 A | 2/1997 | Cook | |
| 5,619,177 A | 4/1997 | Johnson et al. | |
| 5,622,482 A | 4/1997 | Lee | |
| 5,639,568 A | 6/1997 | Pedicini et al. | |
| 5,641,585 A | 6/1997 | Lessing et al. | |
| 5,691,074 A | 11/1997 | Pedicini | |
| 5,730,587 A | 3/1998 | Snyder et al. | |
| 5,747,187 A | 5/1998 | Byon | |
| 5,758,823 A | 6/1998 | Glezer et al. | |
| 5,759,014 A | 6/1998 | Van Lintel | |
| 5,778,513 A | 7/1998 | Miu et al. | |
| 5,861,703 A | 1/1999 | Losinski | |
| 5,914,507 A | 6/1999 | Polla et al. | |
| 5,919,582 A | 7/1999 | Pedicini et la. | |
| 6,033,191 A | 3/2000 | Kamper et al. | |
| 6,274,261 B1 * | 8/2001 | Tinker et al. | 429/27 |

\* cited by examiner

AIR MANAGER SYSTEMS FOR BATTERIES UTILIZING A DIAPHRAGM OR BELLOWS

RELATED APPLICATIONS

The following patent applications for related subject matter,
"CYLINDRICAL METAL-AIR BATTERY WITH A CYLINDRICAL PERIPHERAL AIR CATHODE" Ser. No. 09/215,020;
"AIR MOVER FOR A METAL-AIR BATTERY UTILIZING A VARIABLE VOLUME ENCLOSURE" Ser. No. 09/216,113;
"DIFFUSION CONTROLLED AIR VENT WITH AN INTERIOR FAN" Ser. No. 09/215,879;
"UNIFORM SHELL FOR A METAL-AIR BATTERY" Ser. No. 09/216,114;
"LOAD RESPONSIVE AIR DOOR FOR A METAL-AIR CELL" Ser. No. 09/216,115;
"Geometry Change Diffusion Tube For Metal-Air Batteries" Ser. No. 09/216,273;
"AIR-MANAGING SYSTEM FOR METAL-AIR BATTERY USING RESEALABLE SEPTUM" Ser. No. 09/216,343; and
"AIR DELIVERY SYSTEM WITH VOLUME-CHANGEABLE PLENUM OF METAL-AIR BATTERY" Ser. No. 09/216,660; all of which are incorporated herein by reference, have been filed concurrently with the present application.

TECHNICAL FIELD

The present invention relates to metal-air batteries of the type that are supplied with reactive gas by an active air moving device, and more particularly relates to an air mover mechanism that utilizes a diaphragm or bellows to move air in and out of one or more air openings or to move air from an inlet to an outlet.

BACKGROUND OF THE INVENTION

Generally described, a metal-air cell, such as a zinc-air cell, uses one or more air permeable cathodes separated from a metallic zinc anode by an aqueous electrolyte. During operation of the cell, oxygen from the ambient air is converted at the one or more cathodes to produce hydroxide ions. The metallic zinc anode is then oxidized by the hydroxide ions. Water and electrons are released in this electrochemical reaction to provide electrical power.

Initially, metal-air cells found limited commercial use in devices, such as hearing aids, which required a low level of power. In these cells, the air openings which admitted air to the air cathode were so small that the cells could operate for some time without flooding or drying out as a result of the typical difference between the outside relative humidity and the water vapor pressure within the cell. However, the power output of such cells was too low to operate devices such as camcorders, cellular phones, or laptop computers. Furthermore, enlarging the air openings of a typical "button cell" was not practical because it would lead to premature failure as a result of flooding or drying out.

In order to increase the power output of metal-air cells so that they could be used to operate devices such as camcorders, cellular phones, or laptop computers, air managers were developed with a view to providing a flow of reactive air to the air cathodes of one or more metal-air cells while isolating the cells from environmental air and humidity when no output is required. As compared to conventional electrochemical power sources, metal-air cells containing air managers provide relatively high power output and long lifetime with relatively low weight. These advantages are due in part to the fact that metal-air cells utilize oxygen from the ambient air as the reactant in the electrochemical process as opposed to a heavier material such as a metal or a metallic composition. Examples of air managers are shown in U.S. Pat. Nos. 4,913,983, 5,356,729, and 5,691,074.

A disadvantage of most air managers, however, is that they utilize an air moving device, typically a fan or an air pump, that occupies space that could otherwise be used for battery chemistry to prolong the life of the battery. This loss of space presents a particular challenge in attempts to provide a practical metal-air cell in small enclosures such as the "AA" cylindrical size now used as a standard in many electronic devices.

In addition to being bulky, air moving devices used in metal-air batteries also consume energy stored in the metal-air cells that might otherwise be delivered as power output to a load. Complicated electronics for controlling an air manager can increase this use of stored energy. Also, as most air moving devices used in metal-air cells distribute air to a cathode plenum at low pressure, a flow path must be defined passing over all regions of the cathode surface to evenly distribute air to the entire cathode surface. Thus, the function of bringing in make up air and the function of mixing and distributing air within the battery have been separate. A further disadvantage of fans used as air moving devices in metal-air cells is that they may create noise at a level disruptive to users of devices such as cellular telephones.

As a result, while a key advantage of metal-air cells is their high energy density resulting from the low weight of the air electrode, this advantage is compromised by the space and power required for an effective air manager, and the noise it may produce.

Therefore, there has been a need in the art for an air manager incorporating an air moving device that occupies less of the volume available for battery chemistry, is usable with advanced systems for isolating the air electrodes when power is not being drawn from the metal-air cell, is quiet, does not require a complex baffle system in the cathode air plenum to distribute the air, needs relatively simple controls, and consumes power at a relatively low rate.

SUMMARY OF THE INVENTION

The present invention seeks to provide an improved air moving device for metal-air cells that occupies a minimal amount of the volume available for battery chemistry, is usable with advanced systems for isolating the air electrodes when power is not being drawn from the metal air cell, and is capable of developing high velocity air movement at a relatively low rate of power consumption.

In accordance with one aspect of the invention, this object is accomplished by providing an air-moving device for supplying ambient air to the air electrodes of a metal-air cell by moving the air alternately in through and out of a passageway extending from the air electrodes to an outside air environment.

In a preferred embodiment, the air moving device is a diaphragm or bellows reciprocated by a linear actuator, such as an electromagnetic oscillator, or a shape memory alloy wire. There may be one or more passageways preferably including an isolating passageway such as a thin elongate tube shaped to impede air flow to the air electrode when the air moving device is not operative, even while the tube remains unsealed. In this embodiment, the function of bringing in make up air is combined with the function of circulating and mixing the air for the metal-air cell or cells by giving the make up air stream sufficient pressure and velocity to provide mixing and circulation. Make up air entry points can be located to make use of the inertial force of the air stream along with diffusion and thermal forces to perform the circulation and mixing function. Furthermore, the air movers of this embodiment can have simplified controls and power requirements that use up less than 5% of the energy stored in the battery. In particular, when the actuator is a shape memory wire or electromagnetic oscillator, controls needed to supply a fixed voltage and the attendant voltage conversion and regulation needed to run fans and blowers may be eliminated.

According to another of its aspects, the present invention provides a reciprocating partition for moving air and one or more ventilation passageways extending through the partition and operable for providing outside air to a metal-air cell as the partition reciprocates. The ventilation passageway may be a tube attached at one end to an opening in the partition, the tube reciprocating with the partition. In a preferred form, the partition is a rolling diaphragm.

According to another of its aspects, the present invention provides a ventilation system for a metal-air power supply, having one or more cells each including an air electrode, and at least one air passageway passing between facing surfaces. Each surface defines an opening therethrough and the openings through the surfaces are spaced apart from one another. The passageway is capable of passing sufficient air to operate the cell when associated with an operating air moving device, and the passageway is further operative, while unsealed and not under the influence of an operating air moving device, to restrict air flow through the passageway to protect the cells. Preferably, one of the facing surfaces is a movable diaphragm, and the air moving device includes the diaphragm and an actuator for reciprocating the diaphragm. When the air moving device is not reciprocating the diaphragm, the diaphragm is positioned in a rest position closely adjacent to the other facing surface. In the rest position, the surfaces preferably are, for practical purposes, touching in the region between their respective openings, the centers of which preferably are spaced apart along the surfaces by at least about 1.5 times the diameter of the openings. The surfaces need not, however, be touching, as long as the openings are separated far enough apart, depending on the size of the gap between the surfaces, to retard passage of air between the openings in a manner similar to that provided by the isolation passageways described herein.

According to another of its aspects, the present invention provides in a metal-air battery including a cylindrical housing containing a pair of metal-air cells and a pair of facing air cathodes separated by a generally rectangular cathode air plenum, an air manager comprising an air pathway defined within the housing by the cathode air plenum connected at one end of the housing to a return plenum defined between a chordal wall and a cylindrical wall of the housing. An air moving device is operable to move a flow of air axially through the cathode air plenum and axially in the opposite direction through the return plenum. The housing may further include an air inlet, preferably an isolating tube, providing outside air to the air moving device and an air outlet, also preferably an isolating tube, directing at least a portion of air moving through the return plenum to the exterior of the battery. The air moving device may be a diaphragm reciprocating within a peripheral guide aligned with the cathode plenum.

According to another of its aspects, the present invention provides in a metal-air battery including a housing containing one or more metal-air cells each having an air electrode, an air manager comprising an air pathway defined within the housing and extending adjacent to an air electrode of a metal-air cell; an inlet and an outlet each extending between the air pathway and an environment outside the housing; a micro-oscillator mounted in the air pathway; and a diaphragm air pump connected to the micro-oscillator, the micro-oscillator vibrating the diaphragm to move air along the air pathway between the inlet and the outlet. The micro-oscillator may oscillate the diaphragm at a frequency of 20,000 hertz or greater so that the frequency will be above those normally audible to the human ear. The battery may also define a recirculation path positioned to cause a portion of the air flowing in the air pathway to bypass the outlet.

In a preferred form of this embodiment, the battery includes a pair of metal-air cells and a pair of facing air cathodes separated by a generally rectangular air plenum that includes a central axis of a cylindrical housing. The air pathway is a U-shaped space defined by a cathode current collector extending to divide the air plenum for a portion of the distance across the air plenum.

According to another of its aspects, the present invention provides an air moving device for a metal-air battery including one or more metal-air cells, comprising a flexible membrane, a leaf spring extending across at least a portion of the membrane and attached thereto, a shape memory wire attached at its ends to the leaf spring so as to lie loosely along the leaf spring when the wire is in a relaxed condition; and a circuit selectively connecting the ends of the wire to the cell to direct a current through the wire, causing the wire to shrink, thereby bending the leaf spring, and deforming the membrane to move air within the battery.

The air moving devices and air pathways of the various embodiments of the present invention provide improved air managers for metal-air batteries including one or more metal-air cells. As may be understood from the foregoing, most aspects of the present invention are applicable to individual metal-air cells or to batteries of cells, and to both prismatic and cylindrical cells and batteries.

Other objects, features and advantages of the present invention will become apparent upon reviewing the following detailed description of preferred embodiments of the invention, when taken in conjunction with the drawings and the appended claims.

DETAILED DESCRIPTION

Figure 1:
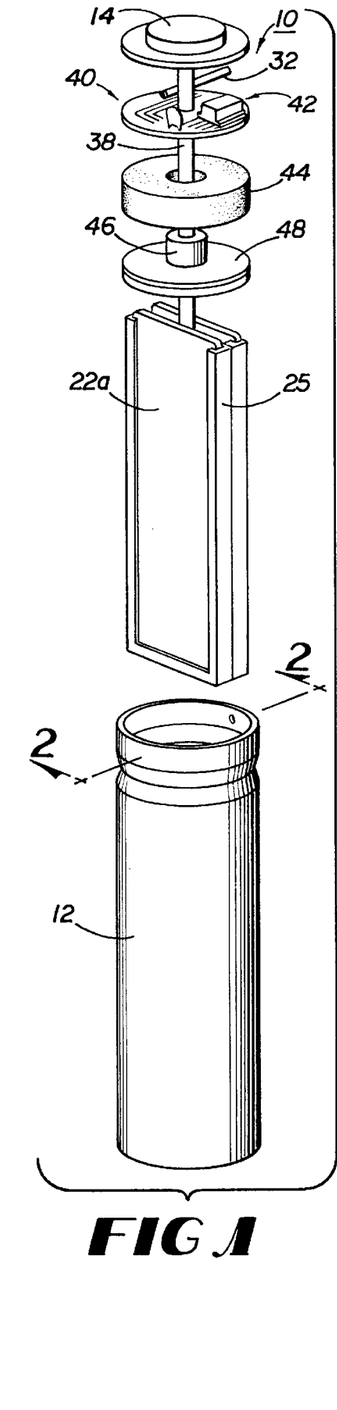
FIG. 1 is an exploded pictorial view of a cylindrical metal-air battery embodying the present invention.
Figure 2:
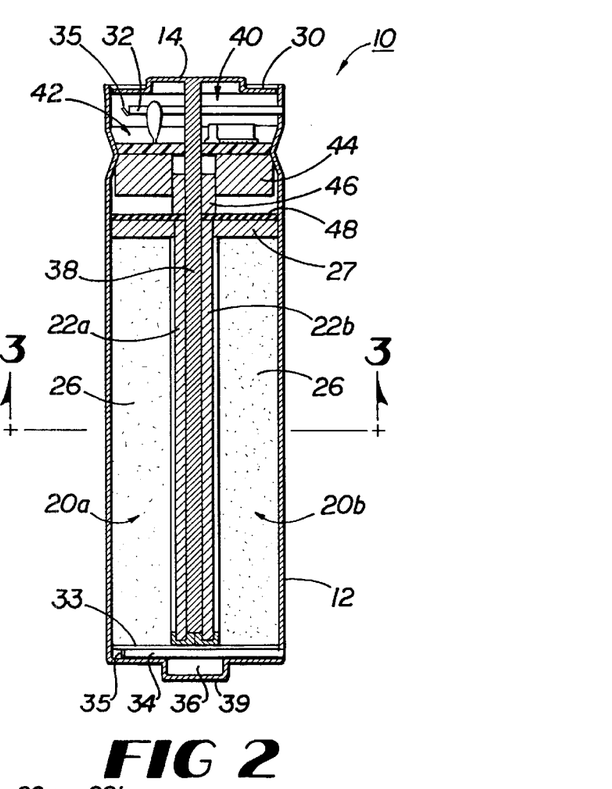
FIG. 2 is an axial cross sectional view taken along line 2—2 of FIG. 1.
Figures 3, 4:
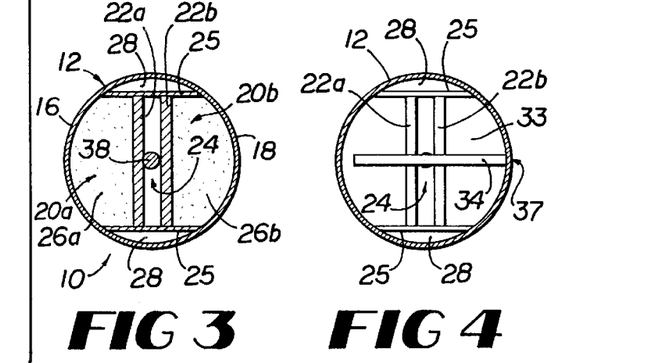
FIG. 3 is a radial cross sectional view taken along line 3—3 of FIG. 2.
FIG. 4 is a bottom view of the interior of the cell of FIGS. 1–3, with the case bottom removed.

Referring now in more detail to the drawings, in which like numerals refer to like parts throughout the several views, FIG. 1 shows an exploded view of the components of a cylindrical metal-air battery 10. The assembled battery is shown in FIGS. 2 and 3. The battery 10 is assembled within a conductive cylindrical case 12, containing a dual-cathode metal-air cell 20. A cap 30 encloses the top of the case 12 and defines a terminal 14 that is electrically insulated from the case 12.

The cell 20 includes two rectangular air cathodes 22a and 22b supported between carrier frame members 25. The air cathodes face each other at the center of the case 12 and are spaced apart to define a central cathode plenum that intersects the central axis of the case 12. Anode material 26, preferably zinc particles suspended in an electrolyte paste or gel, fills volumes defined within each of the cathodes 22a and 22b, the case 12, and the frame members 25. A conventional separator (not shown) separates each cathode from the anode material. Potting material 27 holds the anode material in place. As best shown in FIGS. 3 and 4, the spaces between the frame members 25 and the case 12 provide a pair of side plenums 28 for air recirculation as described below.

The anode material 26 is confined at the bottom of the case by a support plate 33 that spans the cross section of the case 12 a short distance from the bottom of the case, except for openings communicating with the cathode plenum 24 and the side plenums 28, as shown in FIG. 4. A lower plenum 36 below the support plate 33 includes an isolating tube 34 of the type described in detail below. The isolating tube communicates with outside air through an opening 37 in the case 12. The case 12 acts as the anode current collector, defining an anode terminal 39 in the bottom of the case. The cylindrical surface of the case may be wrapped in an insulating film (not shown). A cathode current collector 38 extends downwardly from the terminal 14 along the central axis of the battery into the cathode plenum, where it is electrically connected to current collector screens (not shown) embedded in the air cathodes 22a and 22b.

At the top end of the case 12 an air mover assembly 40 is positioned. A printed circuit board (PCB) 42 carries a control circuit which controls the operation of an electromagnetic oscillator including a coil 44 and a magnet 46. The coil 44 is attached to the bottom of the PCB 42, and the magnet 46 fits around the current collector 38 and within a cylindrical opening in the coil 44. The magnet also is attached to a diaphragm 48, which may be adhered to the case around the periphery of the diaphragm, or may allow air to pass around the periphery of the diaphragm on an upward stroke. In the alternative, the diaphragm may include a pressure equalization opening (not shown). Current supplied from the cells to the coil under control of the control circuit causes the magnet to reciprocate, which reciprocates or vibrates the diaphragm.

Air may pass freely between the space immediately above the diaphragm 48 to an upper space above the PCB 42. Within the upper space, another isolating tube 32 extends from a case opening (not shown) into the interior of the battery. The interior end of the tube 32 may optionally be fitted with a flap valve 35, preferably made of mylar or another flexible material that will move away to open the tube when air is forced through the tube toward the valve, and subsequently return to an unstressed position over the end of the tube 34 when the flow of air ends. The flap fits fairly closely over the end of the tube, but need not seal the tube.

In operation, current is passed through the coil 44 in a manner required to reciprocate the diaphragm 48. If the diaphragm is solid and sealed around its edge, and the optional flap valve 35 is not present, each stroke in one direction will push air out of a first one of the isolating tubes 32, 34, and pull air in through the other tube. The subsequent stroke will push air out of the other isolating tube, and pull air in through the first tube. On each stroke, the diaphragm sucks air in through one of the isolating tubes at high velocity, and this new air mixes with the air within the cathode plenum.

In the alternative, the diaphragm may be mounted to allow air to bypass the diaphragm on the upward stroke, and the flap valve 35 is installed. In this mode a flow of air is established in through the tube 32, which provides an inlet, continuing through the cathode plenum and into the lower plenum 36, and out through the tube 34, which provides an outlet The diaphragm may be made of various flexible materials including a thermoplastic elastomer (TPE) such as SANTO-PRENE® thermoplastic rubber available from Advanced Elastomer Systems. The timing of pulses of air created by the diaphragm may be varied according to the demand for output from the cell 50. If noise is a concern, a frequency of vibration normally below that audible to the human ear will provide sufficient air to operate the cells 20. For example, a diaphragm 2 cm in diameter reciprocated through a 1 mm stroke will move about 0.3 cc per stroke; at 15 Hz, this diaphragm will create a flow of air at about 300 cc per minute. The frequency can be adjusted electrically, or by adjusting the mass moving with the magnet 46.

When the diaphragm air mover is inactive, the isolating tubes 32 and 34 limit the exchange of oxygen and water vapor with the outside air to protect the cell. Characteristics of the isolating tubes are described in detail below.

Figure 5:
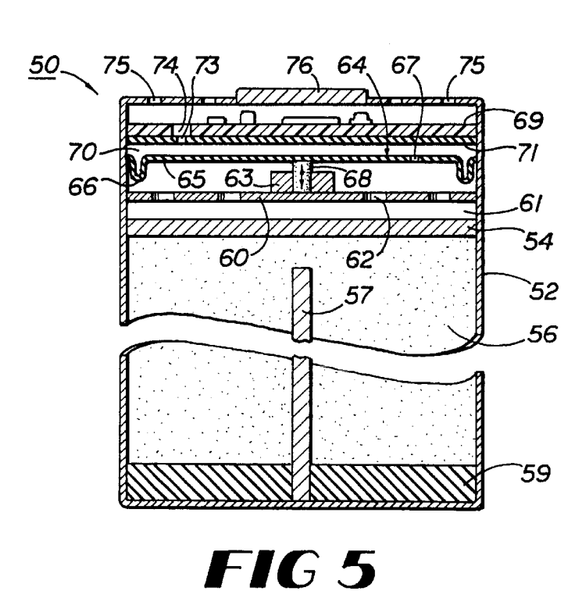
FIG. 5 is diagrammatic axial cross sectional view of a second embodiment of a metal-air cell according to the present invention.
Figure 6:
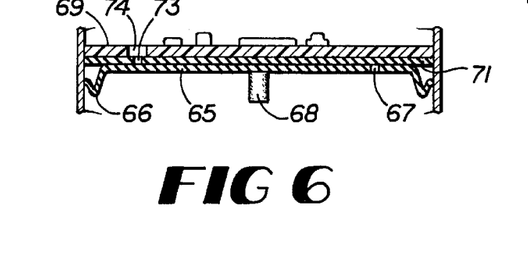
FIG. 6 is a diagrammatic partial cross sectional view of the cell of FIG. 4, showing the diaphragm in an inactive position.

A single cylindrical metal-air cell 50, constructed according to a second embodiment of the present invention, is shown in FIG. 5 and 6. Within a conductive cell case 52, a circular air cathode 54 is positioned radially across the case. Anode material of the type described above fills the case below the cathode 54 and a separator (not shown), down to an elastic member 59, such as a non-reactive foam, in the bottom of the case 52. The elastic member 59 has a spring function to press the anode material against the separator and cathode. An anode current collector spike 57 extends from the conductive case into the anode material along the central axis of the case 52.

Spaced a short distance above the air cathode 54, a circular support partition 60 perforated with air openings 62 extends across the case 52. An air cathode plenum 61 is defined between the cathode 54 and the partition 60. An electromagnetic coil 63 is mounted on the partition 60, preferably centered at the case axis. A rolling diaphragm 64 spans the case spaced above the partition 60. The diaphragm 64 includes a central section 65, which preferably is a relatively rigid planar member occupying most of the cross section of the case 52, and an annular hinge 66 having a U-shaped cross section. The hinge 66, and preferably also the central section 65, are formed from an elastomeric polymer or rubber, and the outer periphery of the hinge 66 is adhered to the case 52. At the center of the diaphragm, a magnet 68 is attached and extends down into an axial opening in the coil 63 for axial relative movement with respect to the coil. Together, the coil 63 and the magnet 68 form an electromagnetic oscillator that drives the rolling diaphragm 64 in a reciprocating manner. Current to cause this action is supplied to the coil 63 from the cell 50 via a control circuit mounted on a PCB 69 that spans the case above the diaphragm 64.

An opening 67 is formed in the central section 65 of the diaphragm 64, spaced radially from the axis of the cell. An elastomeric coating 71 is applied to the underside of the PCB 69, and an opening 73 is formed in the coating, aligned with an opening 74 in the PCB. The opening 73 preferably has a size similar to that of the opening 67, and its center is positioned at a location spaced in a radial plane from the center of the opening 67, preferably by at least 1.5 times the diameter of the openings. It should be noted that more than one opening 67 or 73 or both may be provided. The size of the openings 67 and 73 may be varied depending on the amount of air exchange desired. One of more exterior air openings 75 are provided in the case 52 above the PCB 69. A cathode terminal 76 is provided at the top of the case. The terminal 76 is electrically connected to the cathode 54 and insulated from the remainder of the case 52.

In operation of the cell 50 of FIGS. 5 and 6, current is passed through the coil 63 in a manner required to reciprocate the diaphragm 64. The length of travel of the central section 65 from its uppermost to its lowermost position is preferably 1 mm or more, and more preferably falls in a range from about 2 mm to about 3 mm in a cell 50 of "AA" size. As the magnet 68 pulls the diaphragm downward, air is compressed in the cathode plenum 61 and therefore exits through the opening 67. This action also pulls air from above the PCB 69 into the space between the PCB and the diaphragm, where it mixes with the air exiting the plenum 61, and tends to pull air into the cell from the outside through air openings 75. When the diaphragm moves up, air from above the diaphragm is sucked into the cathode plenum 61, and air above the diaphragm is pumped out into the space above the PCB 69. In this way, air from the outside containing fresh oxygen gradually makes its way to the cathode plenum 61, and spent air gradually makes its way out of the cell. At each stage, incoming and exiting air masses mix together. The large area of the diaphragm 64 builds a pressure within the cathode plenum, which causes a rapid flow of air through the opening 67, tending to evenly mix the oxygen within the plenum for optimal consumption by the air cathode 54.

On its upward stroke, the diaphragm section 65 preferably engages or moves very close to the coating 71, as shown in FIG. 6. During pumping of air, this results in efficient replacement of air in the space above the diaphragm. When the air moving function is inactive, the diaphragm preferably is stopped in this upward position, so that air attempting to move between the openings 67 and 73 is effectively inhibited from flowing therebetween. It is not critical that the diaphragm and the coating completely seal the path between the openings. For example, when the gap between the surfaces is about 0.2 mm or less and the distance between the openings 67 and 73 is about 2 mm or more, the gap will act to inhibit diffusion of air molecules, including oxygen and water vapor, in a manner similar to the protective function of the isolating tubes 32 and 34 described above.

Figure 7:
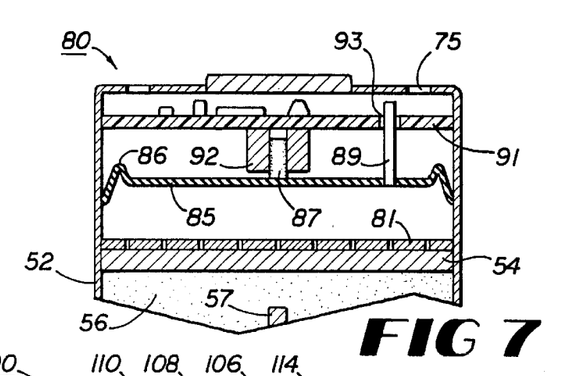
FIG. 7 is diagrammatic partial axial cross sectional view of a third embodiment of a metal-air cell according to the present invention.

An alternative embodiment of a metal-air cell 80, similar to the cell 50, is shown in FIG. 7. In this embodiment, a mask 81 is shown over the air cathode 54. The mask has small openings to control air flow to the cathode in a known manner, and can be used with any of the air cathodes disclosed in this application. A rolling diaphragm 85 spans the cell case above the air cahode 54, with a magnet 87 attached to its upper surface. An isolating tube 89 is attached to the diaphragm and extends upwardly from an opening in the diaphragm. Above the diaphragm 85, a PCB 91 contains a control circuit and supports a coil 92 that extends down to receive the magnet 87. The PCB 92 defines an opening 93 through which the isolating tube 89 freely passes.

In operation of the cell 80, current is passed through the coil 63 in a manner required to reciprocate the diaphragm 85. The isolating tube 89 moves with the diaphragm. On its downward stroke, the diaphragm forces air out through the tube 89 by compressing the air in a cathode plenum 84 between the diaphragm and the mask 81. On its upward stroke, the diaphragm sucks air into the cathode plenum through the tube 89 at a high velocity. The air above the diaphragm mixes with new oxygen from the outside as a result of exchange of air through the air openings 75. Therefore, make-up oxygen is fed into the cathode plenum with the air pulled in through the tube 89. When the diaphragm air mover is inactive, the isolating tube 89 limits the exchange of oxygen and water vapor with the outside air to protect the cell. The components of the cell 80 not particularly described are constructed and operate in a manner similar to their counterpart elements in the cell 50.

Figure 8:
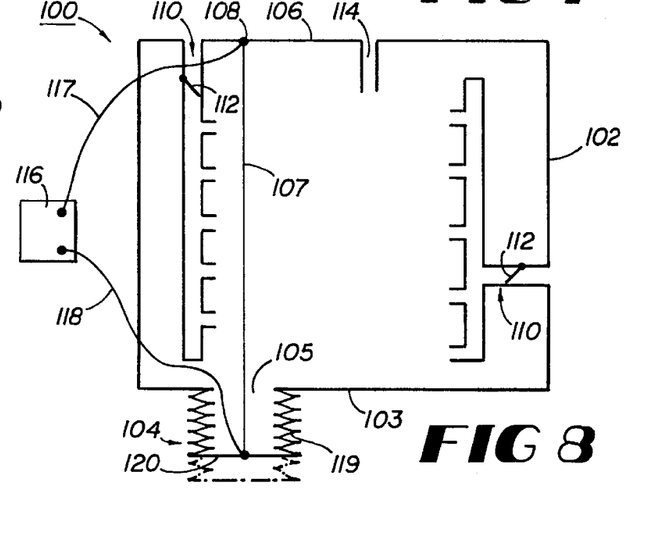
FIG. 8 is diagrammatic top view of the interior of a prismatic metal-air cell according to a fourth embodiment of the present invention.

FIG. 8 shows diagrammatically a prismatic battery 100 constructed according to another embodiment of the present invention. The battery 100 includes a prismatic housing 102 in which are positioned a plurality of prismatic metal-air cells (not shown). A bellows 104 is mounted on an exterior wall 103 of the housing 102 to communicate with the interior of the housing through an opening 105. The bellows preferably is an electroformed metal bellows an accordion fold side wall 119 surrounding a planar member 120. A shape memory alloy wire 107 is connected to the planar member 120 of the bellows 104, extends through the opening 105, across the cell housing 102, and is attached to an opposite housing wall 106 at a connector 108. A pair of inlet isolating and distributing tubes 110 extend into the housing and branch to distribute air to the various cells. The tubes 110 branch into a plurality of air inlets 111 that are positioned in an array laid out so that high pressure air entering through the inlets 111 will cause mixing and circulation of air to all the air electrode surfaces in the housing 102. Near the location at which the tubes 110 enter the housing 102, each includes an interior mylar flap valve 112 mounted to inhibit air from exiting the housing through the tube 110. Air exits the housing through an outlet isolating tube 114 extending into the housing from the wall 106. Power is supplied to the shape memory wire 107 by a timing circuit 116 connected to the ends of the wire 107 by leads 117 and 118.

By shape memory alloy wire, we mean a wire, for example, nitinol alloy, with nearly equal atomic amounts of nickel and titanium, that is made to "remember" a particular shape. Such a shape memory alloy wire is formed at low temperatures to the desired shape, clamped, and then heated past its transformation temperature to its annealed temperature. When cooled, the shape memory alloy wire can be easily deformed. Thereafter, the wire will return to its annealed shape when heated. After the heat source is removed, the wire can be forced back to its deformed shape and the cycle can be repeated. A shape memory alloy wire can thus provide mechanical movement without the use of a traditional motor, solenoid, or other actuator. A preferred shape memory alloy is sold by Dynalloy, Inc. or Erin. California under the trademark "Flexinol" actuator wires.

When current is applied across the wire 107, it heats and shrinks in a known manner from the configuration shown in dashed lines to the configuration shown in fill lines in FIG. 8. This causes the bellows to compress the air within the housing 102 and expel some air through the outlet tube 114. The flap valves 112 limit expulsion of air through the inlet tubes 110. When the wire 107 cools, the spring action of the bellows 104 stretches the wire 107, returning the bellows to its expanded configuration. This action reduces the pressure within the housing, drawing air in through the tubes 110. When the bellows is not being cycled by the wire 107, the isolating tubes 110 and 114 limit the exchange of oxygen and water vapor with the outside air to protect the cell.

Referring to the shape memory alloy wire 107 (and the wires 136 and 163 described below), the gage of the wire should be reduced as much as possible to minimize thermal mass, while still providing the tensile strength needed to move the load to which the wire is attached in the various embodiments of the present invention. Multiple parallel wires may be used. A gage of 0.025 inch (0.6 mm) may be used for air movers in individual cells and battery packs for portable electronic devices.

Figure 9:
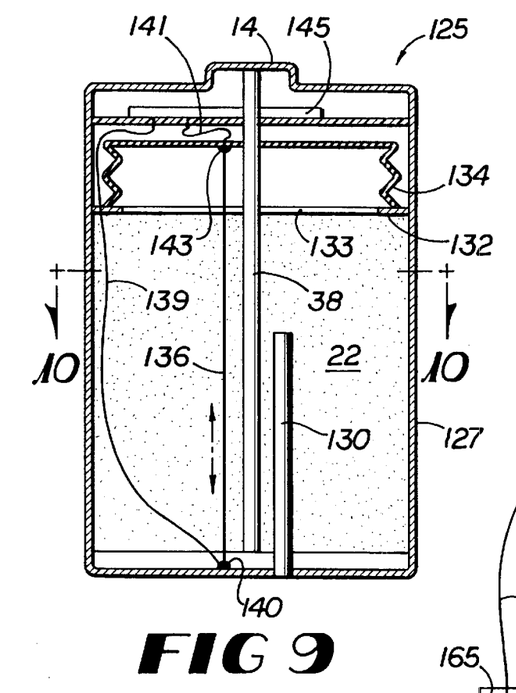
FIG. 9 is diagrammatic partial axial cross sectional view of a fifth embodiment of a cylindrical metal-air battery according to the present invention, taken along line 9—9 of FIG. 10.
Figure 10:
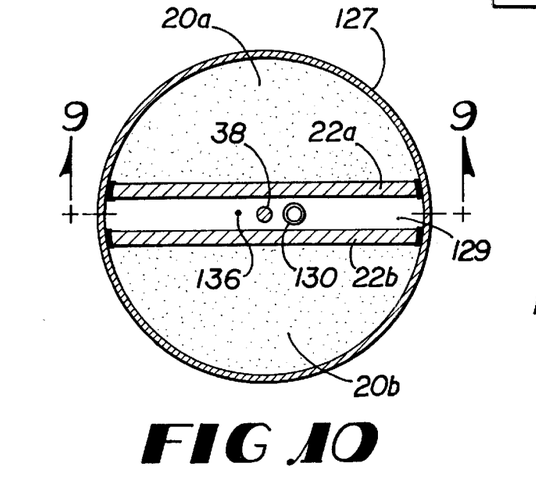
FIG. 10 is a top cross sectional view taken along line 10—10 of FIG. 9.

A battery 125 constructed according to a further embodiment of the present invention is shown in FIGS. 9 and 10. The battery 125 includes a dual-cathode cell 20 rwithin a case 127, in the same basic configuration as the first embodiment of FIG. 1. When the reference numerals used are those used for corresponding elements in the embodiment of FIG. 1, their construction or composition is similar to the earlier embodiment. In the battery 125, however, the cathodes 22a and 22b extend to a position adjacent to the interior walls of the case 127, from which they are insulated. A rectangular cathode plenum 129 is formed between the facing cathodes. From an opening in the bottom of the case 127, an isolating tube 130 extends up into the plenum 129, preferably to end at a position near the center of the plenum, and radially near the cathode current collector spike 38.

A circular support plate 132 spans the case 127 above the anode and cathode components, and defines a slot 133 over the cathode plenum 129 to allow free air flow. A bellows 134 is adhered to the plate 132 near the periphery of the case 127, sealing around the slot 133. The bellows is compressed and expanded by a shape memory alloy wire 136 that extends from a connector 143 near the center of the bellows down through the cathode plenum 129 to a connector 140 insulated from the case bottom. Electric current to operate the wire 136 is provided from a control circuit mounted on a PCB 145 through a lead 139 attached to the connector 140, and a lead 141 attached to the connector 143.

In operation of the battery 125, current is applied across the wire 136, it heats and shrinks in a known manner, causing the bellows 134 to compress the air within the cathode plenum 129 and expel some air through the isolating tube 130. When the wire 136 cools, the spring action of the bellows 134 stretches the wire 136, returning the bellows to its expanded configuration. This action reduces the pressure within the plenum 129, drawing air in through the tube 130 at high velocity. Elevated pressure can be used to impart velocity to the air stream to perform enough mixing to achieve the needed level of oxygen concentration throughout the cathode plenum. High pressure also can allow a highly restrictive isolating tube 130, in which case it may be possible to eliminate a cathode mask of the type shown in FIG. 7, which can result in improvement of the rate capability and the energy density of the battery. When the bellows is not being moved, the isolating tube 130 limits the exchange of oxygen and water vapor with the outside air to protect the cells 20. More than one isolating tube can be installed for better air distribution. Such tubes can be of varying lengths, and each tube can perform alternating inlet and outlet functions as the bellows expands and contracts.

Figure 11:
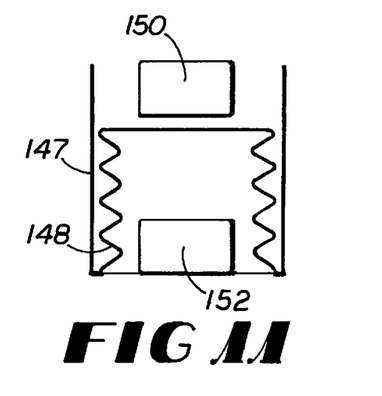
FIG. 11 is a diagrammatic view of an alternative drive mechanism for a bellows of the type shown in FIG. 9, according to a sixth embodiment of the present invention.

An alternative system for reciprocating a bellows 148 of the type that may be used in the embodiments of FIGS. 8 and 9 is shown in FIG. 11. The bellows 148 fills the cross section of a tubular case 147. A pair of controllable electromagnets 150 and 152 are provided, one inside and one outside of the bellows. The electromagnets can be energized in a sequential fashion to pull the planar member of the bellows in one direction and then the other with respect to the case 147.

Figure 12:
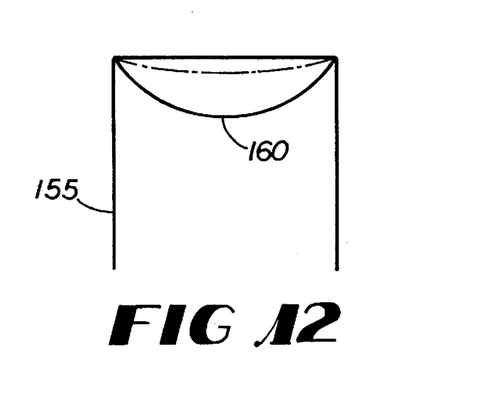
FIG. 12 is a diagrammatic side cross sectional view of a diaphragm drive mechanism according to a seventh embodiment of the present invention.
Figure 13:
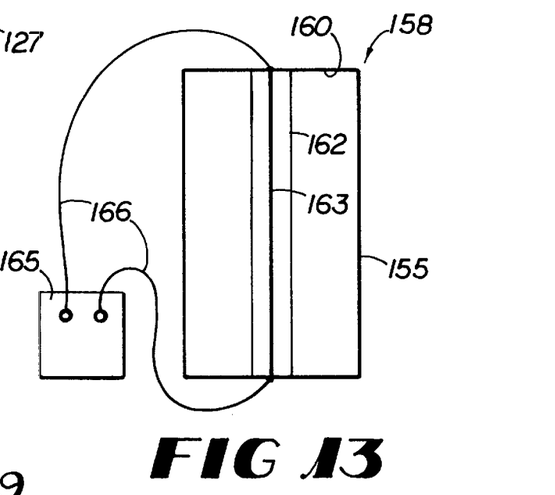
FIG. 13 is a diagrammatic plan view of the drive mechanism of FIG. 12.

A modified diaphragm air mover 158 is shown diagrammatically in FIGS. 12 and 13. The air mover 158 can be used in a battery of the type shown in FIG. 1 or FIG. 9 as well as in a cell of the type shown in FIG. 5. Positioned to span a cell case 155 above a cathode plenum, the air mover assembly 158 includes an elastic membrane 160 made of an elastic polymer, such as SANTOPRENE® thermoplastic rubber. A flat leaf spring 162 made of metal or plastic is laminated across a width, or diameter, of the membrane 160. A shape memory alloy wire 163 is attached at its ends to opposite ends of the leaf spring 162. In its relaxed state, the wire lies loosely against the leaf spring, which then has the dashed line configuration shown in FIG. 12. A timing circuit 165 configured to supply current from the cells of the metal-air battery is connected by leads 166 to the ends of the wire 163 so that the current is directed through the wire 163 for time periods determined by the circuit 165. The wire 163 shrinks when heated by the current, and, as it shortens, it buckles the leaf spring 162, causing the membrane 160 to bow as shown in the solid line configuration of FIG. 12. Then, when the wire 163 cools, the resiliency of the spring 162 stretches the wire back to its original length and draws the membrane 160 back to a flat configuration. Such reciprocating motion of the membrane moves air in one of the above-described cells or batteries along the same paths as the air is moved by a bellows or rolling diaphragm.

The buckling motion created by the shrinking of the shape memory alloy wire can also be provided by a piezoelectric acutator.

Figure 14:
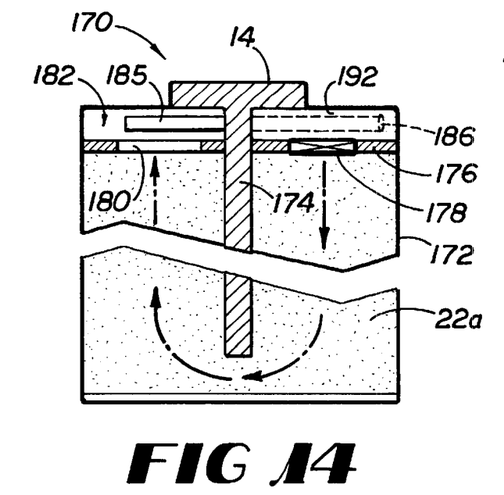
FIG. 14 is a diagrammatic axial cross sectional view of an eighth embodiment of a metal-air battery according to the present invention.
Figure 15:
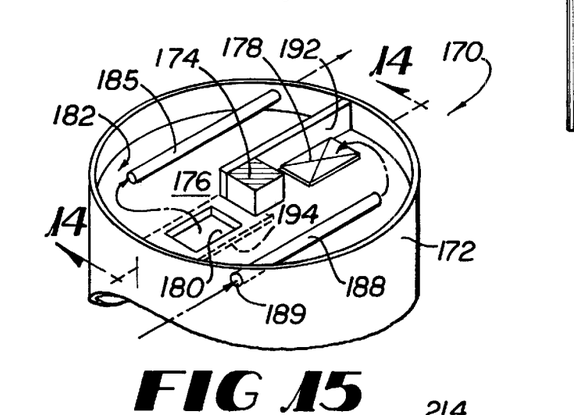
FIG. 15 is a pictorial view of the interior of an upper portion of the cell of FIG. 14.
Figure 16:
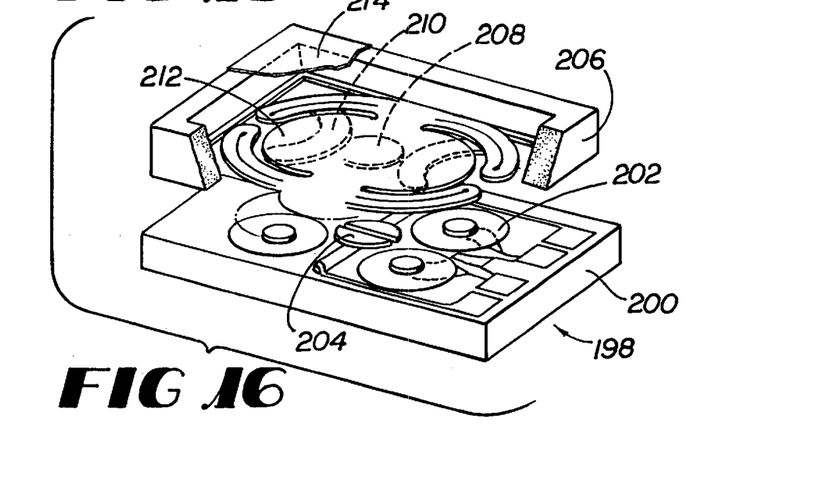
FIG. 16 is an exploded pictorial view of a microrelay device used in the battery of FIGS. 14 and 15.

A battery 170 constructed according to a further embodiment of the present invention utilizing an micromachine air mover is shown in FIGS. 14, 15, and 16. The battery 170 includes a dual-cathode cell within a case 172, in the same basic configuration as the embodiment of FIG. 9. However, a cathode current collector 174 extending down from the terminal 14 terminates above the bottom of the case 172 and fills the entire width of the cathode plenum between the cathodes 22a and 22b. A support plate 176, through which the current collector spike 174 passes, closes off the cells from an upper plenum 182 except for a microrelay driven air pump 178 positioned over one side of the cathode plenum, and a ventilation opening 180 allowing air flow from the other side of the cathode plenum to the upper plenum.

An isolating tube 185 extends from an opening 186 in the case 172 into the upper plenum 182 on one side of the cathode current collector 174. A second isolating tube 188 extends from an opening 189 in the case 172 into the upper plenum 182 on the other side of the cathode current collector 174. Between the two isolating tubes, the upper plenum is divided by a pair of baffles as shown in FIG. 15. One baffle 192 extends from the case wall to the collector 174 between the air pump 178 and the tube 185. The other baffle 194 (shown in dashed lines) extends from the case wall to the collector 174 between the ventilation opening 180 and the tube 188.

FIG. 16 shows a microrelay drive 198 of a type known to those skilled in the micromachine art, suitable for use in the air mover 178. A suitable microrelay is shown in U.S. Pat. No. 5,778,513. In the microrelay drive 198, a main frame 200 supports planar copper coils 202 and gold contact pads 204. Within an upper frame 206, a gold shunt pad 208, movable permalloy pole pieces 210, and a movable silicon platform 212 overlay the coils and contact pads. A diaphragm 214 (shown only in part to reveal internal detail) is physically connected to vibrate with the silicon platform 212. The diaphragm and the microrelay together form the micro-oscillator air mover 178.

The diaphragm 214 is constructed with an air bypass (not shown) so that the air mover pumps air in one direction into the cathode plenum. It thus will be seen that a flow-through air path is defined for air entering through the isolating tube 188, being pumped in a U-shaped path down one side of the cathode plenum and back up the other side, through the opening 180, and out of the battery through the isolating tube 185. The microrelay of the drive 198 can oscillate at a rate above the frequency normally audible to the human ear, such as 20,000 Hz or higher. At such a high rate of pumping, even though the volume of air moved per stroke is small, the flow rate is high and the pressure differential across the air mover is high. The pressure differential across the isolating tube 188 may be 1 psi or higher, which makes it possible to reduce the cross sectional area of the isolating tubes to 0.1 square mm or smaller, while still pulling in enough air to operate the cells of the battery.

The baffles 192 and 194 are shown fully dividing the upper plenum 182. However, it should be understood that the baffle 194 can be perforated to allow a portion of the air pumped by the air mover to be recirculated.

Figure 17:
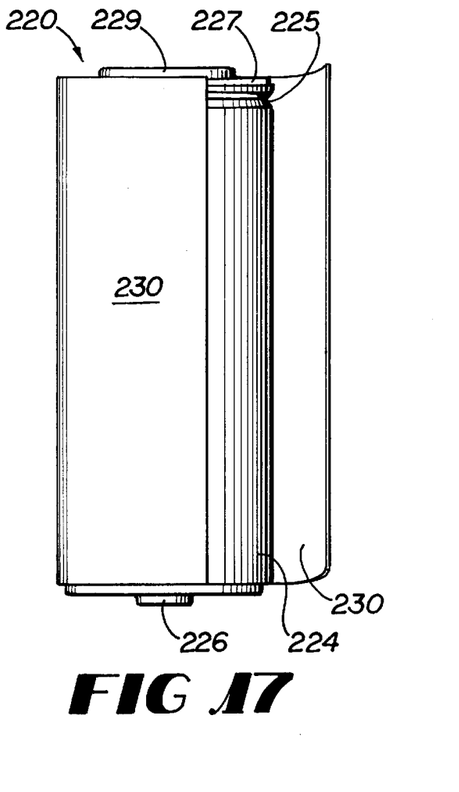
FIG. 17 is a diagrammatic side plan view of a ninth embodiment of a metal-air battery according to the present invention.

A battery 220 constructed according to a further embodiment of the present invention is shown in FIGS. 17 through 20. The battery 220 includes a dual-cathode cell within a case 224, in the same basic configuration as the first embodiment of FIG. 1. When the reference numerals used are those used for corresponding elements in the embodiment of FIG. 1, their construction or composition is similar to the earlier embodiment. As shown in FIG. 17, the case 224 is cup shaped, and defines an annular crimp 225 at its upper end to hold interior components in place, as described below. An insulator layer 227 closes the top of the case and separates the case from a conductive cap 229 that serves as the cathode terminal. An insulating wrapper 230 preferably is laminated to the outer cylindrical wall of the case 224. The case 224 serves as the anode current collector, and at its bottom end forms an anode terminal 226.

Figure 18:
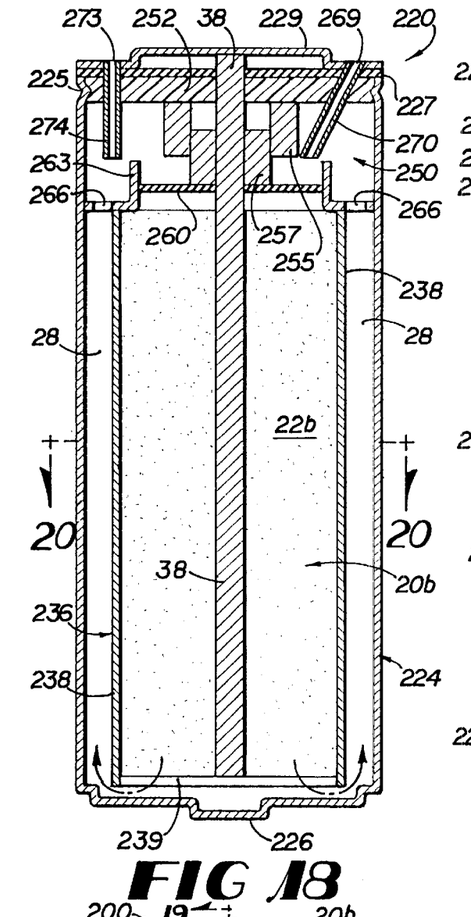
FIG. 18 is an axial cross sectional view taken along line 18—18 of FIG. 20.
Figure 19:
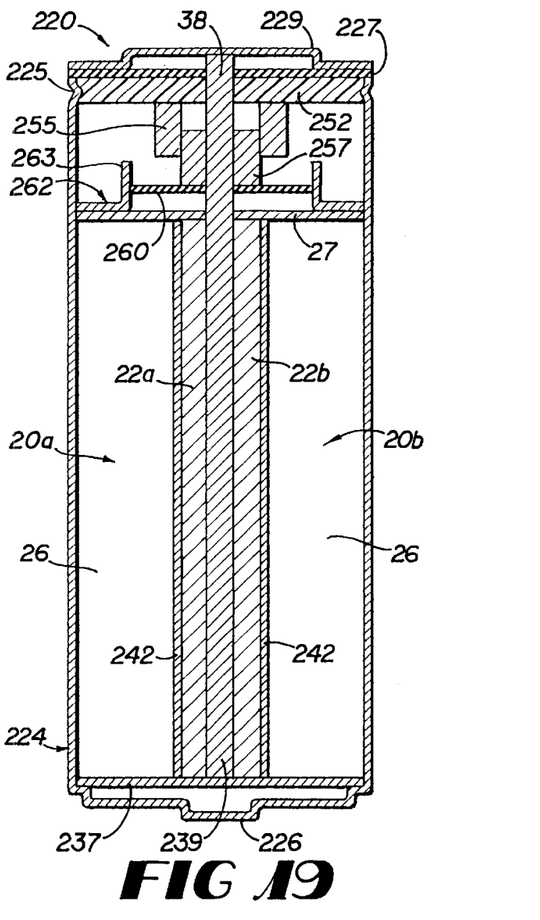
FIG. 19 is an axial cross sectional view taken along line 19—19 of FIG. 20.
Figure 20:
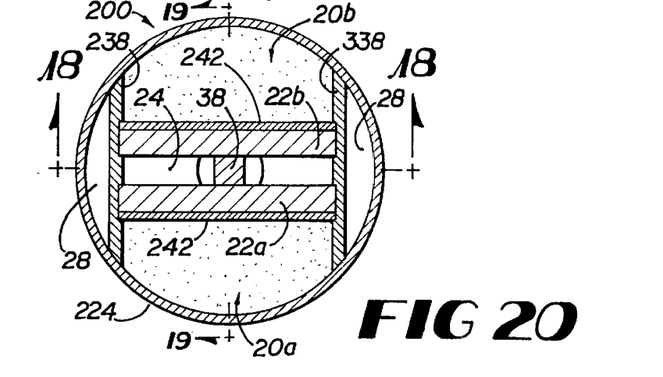
FIG. 20 is a radial cross sectional view taken along line 20—20 of FIG. 18.

Referring to FIGS. 18–20, a U-shaped holder 236 having a bottom support disc 237 and upstanding walls 238 retains the anode material 26 and the cathodes 22a and 22b of the cell 20. A separator 242 is shown between the anode and cathode of each cell. A cathode air plenum 24 is formed between the cathodes 22a and 22b, and a cathode current collector 38 extends from the cathode terminal 229, through the insulator layer 227 and down the length of the plenum 24.

The walls 238 of the cell holder 236 span a chord of the cross section of the case 224 to define two side return plenums 28. In the bottom support disc 237, a slot 239 is formed corresponding to the cathode plenum 24 to allow air to move from the cathode plenum into the return plenums 28 between the chordal walls 238 and the arcuate cell case 224.

At the top end of the case 224 an air mover assembly 250 is positioned. A PCB 252, shown diagrammatically, provides a structural member across the top of the case 224, and is held in position by the crimp 225 that is formed with the PCB in place. The PCB carries a control circuit which controls the operation of an electromagnetic oscillator including a coil 255 and a magnet 257. The coil 255 is attached to the bottom of the PCB 252, and the magnet 257 fits around the current collector 38 and within a cylindrical opening in the coil 255. The magnet also is attached to a diaphragm 260, which moves within a diaphragm guide 262. The guide 262 is an annular member attached to the case 224 above potting material 27, and defines a pair of air openings 266 above each of the return plenums 28. The guide 262 also provides a cylindrical peripheral guide wall 263 within which the diaphragm 260 moves. The diaphragm 260 allows air to pass around the periphery of the diaphragm on an upward stroke, or may include a pressure equalization opening (not shown) for the same purpose. Current supplied from the cells to the coil under control of the control circuit causes the magnet to reciprocate, which reciprocates or vibrates the diaphragm within the guide wall 263.

An inlet isolating tube 270 extends from an opening 269 in the cap 229 through the insulator 227 and the PCB 252 diagonally to a point over the diaphragm 260. An outlet isolating tube 274 extends from an opening 273 in the cap 229 through the insulator 227 and the PCB 252 to a point outside the guide wall 263. Thus, it will be understood that when current pulses are supplied in a known manner to the coil 255, the diaphragm operates as an air pump to draw air in through the tube 270, and pump the air across the air cathodes 22 on both sides of the current collector 38, through the slot 239, up through the return plenums 28 and the openings 266, and out of the cell through the tube 274. The diaphragm builds a pressure within the cathode plenum in this mode. The timing of pulses of air created by the diaphragm may be varied according to the demand for output from the battery 220. When the diaphragm air mover is inactive, the isolating tubes limit the exchange of oxygen and water vapor with the outside air to protect the cell. The more powerful the diaphragm air pump, the more restrictive and protective the isolating tubes 270 and 274 can be.

It should be understood that the actuators for driving reciprocating motions described above in connection with particular embodiments can be utilized in the other embodiments described. Furthermore, the reciprocating motions provided by the actuators described above in connection with the various embodiments could also be performed by a motor, piezoelectric element, or fluid operated cylinders or chambers.

Referring in detail to the isolating passageways described above, these isolating passageways are preferably constructed and arranged to allow a sufficient amount of airflow therethrough while the air moving device is operating so that a sufficient output current, typically at least 50 ma, and preferably at least 130 ma can be obtained from the metal-air cells. In addition, the isolating passageways are preferably constructed to limit the airflow and diffusion therethrough such that the drain current that the metal-air cells are capable of providing to a load while the air moving device is not forcing airflow through the isolating passageways is smaller than the output current by a factor of about 50 or greater. In addition, the isolating passageways are preferably constructed to provide an "isolation ratio" of more than 50 to 1.

The "isolation ratio" is the ratio of the rate of water loss or gain by a cell while its oxygen electrodes are fully exposed to the ambient air, as compared to the rate of the water loss or gain of the cell while its oxygen electrodes are isolated from the ambient air, except through one or more limited openings. For example, given identical metal-air cells having electrolyte solutions of approximately thirty-five percent (35%) KOH in water, an internal relative humidity of approximately fifty percent (50%), the ambient air having a relative humidity of approximately ten percent (10%), and no fan-forced circulation, the water loss from a cell having an oxygen electrode fully exposed to the ambient air should be more than 100 times greater than the water loss from a cell having an oxygen electrode that is isolated from the ambient air, except through one or more isolating passageways of the type described above. In this example, an isolation ratio of more than 100 to 1 should be obtained.

More specifically, each of the isolating passageways preferably has a width that is generally perpendicular to the direction of flow therethrough, and a length that is generally parallel to the direction of flow therethrough. The length and the width are selected to substantially eliminate airflow and diffusion through the isolating passageways while the air moving device is not forcing airflow through the isolating passageways. The length is greater than the width, and more preferably the length is greater than about twice the width. The use of larger ratios between length and width are preferred. Depending upon the nature of the metal-air cells, the ratio can be more than 200 to 1. However, the preferred ratio of length to width is about 10 to 1.

The isolating passageways could form only a portion of the path air must take between the ambient environment and the oxygen electrodes. Each of the isolating passageways may be defined through the thickness of the battery housing or cell case, but preferably they are in the form of tubes as described above. In either case, the isolating passageways may be cylindrical, and for some applications each can have a length of about 0.3 to 2.5 inches or longer, with about 0.88 to 1.0 inches preferred, and an inside diameter of about 0.03 to 0.3 inches, with about 0.09 to 0.19 inches preferred. The total open area of each isolating passageway for such applications, measured perpendicular to the direction of flow therethrough, is therefore about 0.0007 to 0.5 square inches. In other applications, such as small cylindrical cells, the isolating passageways each can have a length of about 0.1 to 0.3 inches or longer, with about 0.1 to 0.2 inches preferred, and an inside diameter of about 0.01 to 0.05 inches, with about 0.015 inches preferred. The preferred dimensions for a particular application will be related to the geometry of the passageways and the cathode plenums, the particular air mover utilized, and the volume or air needed to operate the cells at a desired level.

The isolating passageways are not necessarily cylindrical, as any cross-sectional shape that provides the desired isolation is suitable. The isolating passageways need not be uniform along their length, so long as at least a portion of each isolating passageway is operative to provided the desired isolation. Further, the isolating passageways may be straight or curved along their length.

Other exemplary isolating passageways and systems are disclosed in U.S. Pat. No. 5,691,074 and U.S. application Ser. No. 08/556,613, and the entire disclosure of each of those documents is incorporated herein by reference.

While this invention has been described in detail with particular reference to a preferred embodiment thereof, it will be understood that modifications and variations may be made without departing from the scope of the invention as defined in the appended claims.

What is claimed is:

1. A ventilation system for a cell or battery of cells, with the cell or cells each including at least one oxygen electrode, the ventilation system comprising:

at least one passageway operable for communicating between an environment and the cell; and an air moving assembly operative to alternately cause air to flow:

from the environment toward the oxygen electrode through the passageway, so that air flows in a first direction through an opening to the passageway, and from proximate the oxygen electrode toward the environment through the passageway, so that air flows in a second direction through said opening to the passageway, with the second direction being opposite the fist direction, wherein said air moving assembly comprises a reciprocating air moving device.

2. The ventilation system of claim 1, wherein said reciprocating air moving device comprises a diaphragm.

3. The ventilation system of claim 1, wherein said reciprocating air moving device comprises a bellows.

4. The ventilation system of claim 1, wherein said reciprocating air moving device comprises an actuator that moves a partition in response to an electrical stimulus.

5. The ventilation system of claim 4, wherein said actuator comprises a shape memory alloy.

6. The ventilation system of claim 4, wherein said actuator comprises an electromagnetic oscillator.

7. A ventilation system for a cell or battery of cells, with the cell or cells each including at least one oxygen electrode, the ventilation system comprising:

at least one passageway operable for communicating between an environment and the cell; and an air moving assembly operative to alternately cause air to flow:

from the environment toward the oxygen electrode through the passageway, so that air flows in a first direction through an opening to the passageway, and from proximate the oxygen electrode toward the environment through the passageway, so that air flows in a second direction through said opening to the passageway, with the second direction being opposite the first direction, wherein the air moving assembly is mounted within a conduit and comprises:

a flexible membrane comprising a rolling diaphragm including a central portion surrounded by an annular portion adhered to said conduit and having a variable U-shaped cross section; and an actuator operable for causing said central portion to reciprocate, said annular portion flexibly changing cross section to remain adhered to said conduit as said central portion reciprocates.

8. The ventilation system of claim 7, further comprising a first vent opening in said central portion, and a partition positioned in the path of said central portion, said partition defining a second vent opening spaced apart from said first vent opening when said central portion approaches said partition, said first and second vent openings being part of said passageway.

9. The ventilation system of claim 8, wherein at closest approach of said partition and said central portion, the ratio of the distance between said vent openings to the distance between said partition and central portion is about 2:1 or greater.

10. The ventilation system of claim 7, further comprising a first vent opening in said central portion, and a partition positioned in the path of said central portion, said partition defining a second vent opening spaced apart from said first vent opening when said central portion approaches said partition, said first and second vent openings being part of said passageway.

11. A ventilation system for a cell or battery of cells, with the cell or cells each including at least one oxygen electrode, the ventilation system comprising:

at least one passageway operable for communicating between an environment and the cell; and an air moving assembly operative to alternately cause air to flow:

from the environment toward the oxygen electrode through the passageway, so that air flows in a first direction through an opening to the passageway, and from proximate the oxygen electrode toward the environment through the passageway, so that air flows in a second direction through said opening to the passageway, with the second direction being opposite the first direction, wherein the air moving assembly comprises:
a flexible membrane;
a leaf spring extending across at least a portion of said membrane and attached thereto;
a shape memory wire attached at its ends to said leaf spring so as to lie loosely along said leaf spring when said wire is in a relaxed condition; and
a circuit selectively connecting the ends of said wire to said cell to direct a current through said wire, causing said wire to shrink, thereby bending said leaf spring, and deforming said membrane to move air within said battery.

12. A ventilation system for a battery including one or more cells, with the cell or cells each including at least one oxygen electrode, the ventilation system comprising:
a partition;
at least one ventilation passageway extending through the partition and operable for communicating between an environment and a cell; and
an actuator operative for causing the partition to reciprocate in a manner that causes air to be supplied to the oxygen electrode through the passageway.

13. The ventilation system of claim 12, wherein said passageway is defined by said partition.

14. The ventilation system of claim 12, wherein said passageway comprises a tube mounted to move with said partition.

15. The ventilation system of claim 14, wherein at least a portion of said tube is an isolating passageway that is operative to restrict airflow therethrough while said passageway is unsealed and said air moving assembly is not operating.

16. The ventilation system of claim 12, wherein at least a portion of said ventilation passageway is an isolating passageway that is operative to restriction airflow therethrough while said ventilation passageway is unsealed and said air moving assembly is not operating.

17. The ventilation system of claim 12, wherein:
the partition is a first partition, the passageway is a first passageway, and the environment is a first environment; and
the ventilation system further comprises:
a second partition with respect to which the first partition reciprocates, and the first environment is defined between the first and second partitions; and
at least one second passageway extending through the second partition and operable for communicating between the first environment and a second environment.

18. The ventilation system of claim 17, wherein:
the first partition reciprocates between a first position in which said first partition is adjacent to the second partition and a second position in which said first partition is spaced from said second partition; and
while the first partition is in the first position at least one of the passageways selected from the first and second passageways is at least partially occluded by one of the partitions selected from the first partition and the second partition so that the metal-air cell is more isolated from the second environment while the first partition is in the first position than while the first partition is in the second position.

19. A ventilation system for a cell or battery of cells, with the cell or cells each including at least one oxygen electrode, the ventilation system comprising:
at least one passageway operable for communicating between an environment and the cell; and
an air moving assembly comprising a reciprocating air moving device operative to alternately cause air to flow:
from the environment toward the oxygen electrode through the passageway, so that air flows in a first direction through an opening to the passageway, and
from proximate the oxygen electrode toward the environment through the passageway, so that air flows in a second direction through said opening to the passageway, with the second direction being opposite the first direction.

20. A ventilation system for a cell or battery of cells, with the cell or cells each including at least one oxygen electrode, the ventilation system comprising:
at least one passageway operable for communicating between an environment and the cell; and
an air moving assembly operative to alternately cause air to flow:
from the environment toward the oxygen electrode through the passageway, so that air flows in a first direction through an opening to the passageway, and
from proximate the oxygen electrode toward the environment through the passageway, so that air flows in a second direction through said opening to the passageway, with the second direction being opposite the first direction, wherein the air moving assembly is mounted within a conduit and comprises:
  a flexible membrane comprising a rolling diaphragm including a central portion surrounded by an annular portion adhered to said conduit and having a variable U-shaped cross section, and
  an actuator operable for causing said central portion to reciprocate, said annular portion flexibly changing cross section to remain adhered to said conduit as said central portion reciprocates.

21. A ventilation system for a cell or battery of cells, with the cell or cells each including at least one oxygen electrode, the ventilation system comprising:

at least one passageway operable for communicating between an environment and the cell; and an air moving assembly operative to alternately cause air to flow:

from the environment toward the oxygen electrode through the passageway, so that air flows in a first direction through an opening to the passageway, and from proximate the oxygen electrode toward the environment through the passageway, so that air flows in a second direction through said opening to the passageway, with the second direction being opposite the first direction, wherein the air moving assembly comprises:
  a flexible membrane,
  a leaf spring extending across at least a portion of said membrane and attached thereto,
  a shape memory wire attached at its ends to said leaf spring so as to lie loosely along said leaf spring when said wire is in a relaxed condition, and
  a circuit selectively connecting the ends of said wire to said cell to direct a current through said wire, causing said wire to shrink, thereby bending said leaf spring, and deforming said membrane to move air within said battery.

* * * * *